2 Sheets—Sheet 1.

C. H. WESTON.

Assignor of one-half to J. C. NUTE.

LOCK FOR LATHE HEAD STOCKS.

No. 10,900. Reissued Feb. 7, 1888.

WITNESSES:
H. Brown.
A. D. Harrison.

INVENTOR:
C. H. Weston
by Wright Brown & Quinby
Attys.

N. PETERS, Photo-Lithographer, Washington, D. C.

2 Sheets—Sheet 2.

C. H. WESTON.

Assignor of one-half to J. C. NUTE.

LOCK FOR LATHE HEAD STOCKS.

No. 10,900. Reissued Feb. 7, 1888.

WITNESSES:
H. Brown
A. D. Harrison

INVENTOR:
C. H. Weston
G. Wright Brown Connolly
Attys

N. PETERS, Photo-Lithographer, Washington, D. C.

UNITED STATES PATENT OFFICE.

CHARLES H. WESTON, OF MEDFORD, ASSIGNOR OF ONE-HALF TO JOHN C. NUTE, OF EAST BOSTON, MASSACHUSETTS.

LOCK FOR LATHE HEAD-STOCKS.

SPECIFICATION forming part of Reissued Letters Patent No. 10,900, dated February 7, 1888.

Original No. 375,032, dated December 20, 1887. Application for reissue filed January 14, 1888. Serial No. 260,762.

*To all whom it may concern:*

Be it known that I, CHARLES H. WESTON, of Medford, in the county of Middlesex and State of Massachusetts, have invented certain new and useful Improvements in Locks for Lathe Head-Stocks, of which the following is a specification.

This invention relates to metal-working lathes, and has for its object to provide a device whereby the "cone" or stepped pulley may be locked to the gear on the spindle, thereby changing the speed of said spindle. In lathes of this class the cone or stepped pulley is fitted a neat working fit to the "live" or running spindle, and is adapted to revolve thereon unless attached by a suitable device to a gear-wheel which is rigidly connected to the spindle. The lathe is provided with gear-wheels, which are termed the "back gear," and the office of said wheels is to reduce the speed of the lathe in a manner well known to all accustomed to its use. When the lathe is said to be "in gear," the cone or stepped pulley revolves on the spindle and transmits motion to said spindle through the back gears. When it becomes necessary to increase the speed, the lathe is thrown out of gear and the cone is secured so as to rotate with the spindle.

My invention consists in the combination, with the gear and cone or pulley, of a movable locking bolt or catch carried by said gear and adapted to detachably connect the pulley therewith by engaging with orifices or recesses in the latter.

Figure 1:
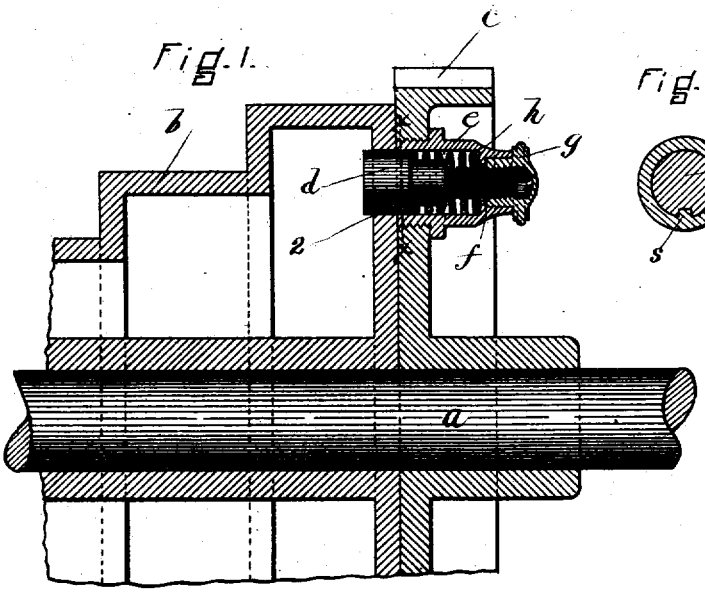
Figure 3:
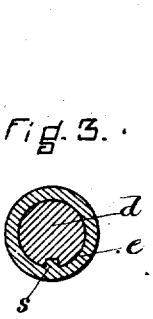
Figure 2:
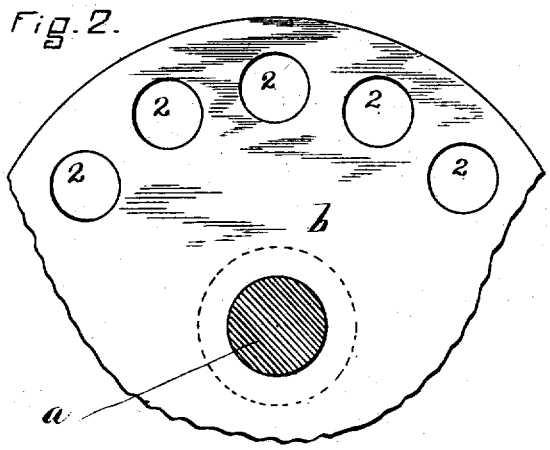
Figure 4:
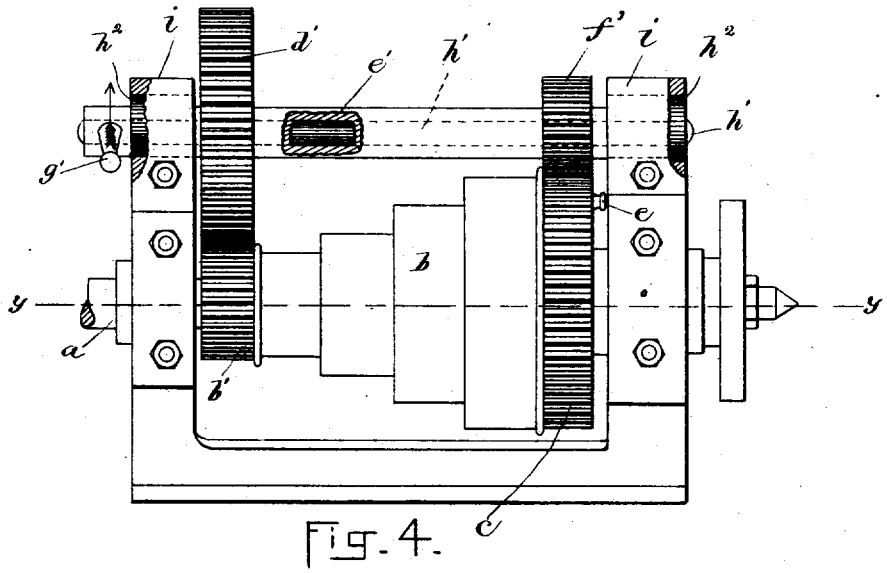
Figure 5:
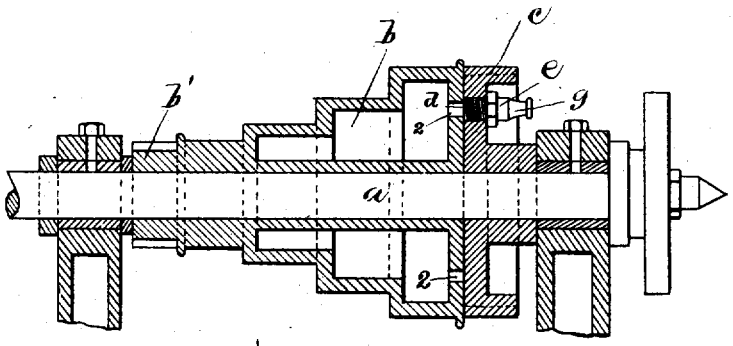

Of the accompanying drawings, forming a part of this specification, Figure 1 represents a transverse vertical section of a portion of a lathe embodying my improvements. Fig. 2 represents a front view of the face of the cone-pulley, hereinafter referred to. Fig. 3 represents a section on line $x\ x$, Fig. 1. Fig. 4 represents a top plan view of the head-stock and back gear of the same. Fig. 5 represents a section on line $y\ y$, Fig. 4.

The same letters of reference indicate the same parts in all the figures.

In the drawings, $a$ represents a portion of the spindle of a lathe.

$c$ represents a gear affixed to said spindle.

$b$ represents a cone or stepped pulley mounted loosely on the spindle $a$.

$b'$ represents a smaller gear affixed to the pulley $b$, and therefore loose on spindle $a$.

$h'$ represents a shaft having enlargements $h^2$ eccentric thereto, and journaled in fixed bearings $i\ i$ on the frame of the lathe. The shaft $h'$ is parallel with the spindle $a$ and has a handle, $g'$, whereby it may be partly rotated. When the shaft is rotated, its eccentric enlargements $h^2$ cause it to move laterally toward or from the spindle $a$.

$e'$ represents a sleeve or tubular shaft mounted to rotate loosely on the shaft $h'$, and provided with two gears, $d'\ f'$, which are rigidly attached to the tubular shaft $e'$, and engage, respectively, with the gears $b'\ c$ when the shaft $h'$ is turned so as to bring it as near the spindle $a$ as it can be. When the gears are thus engaged, as shown in Fig. 4, the gear $c$ being disengaged from the pulley $b$, power is imparted from the pulley $b$ (which is driven by a belt from a driving-shaft) through the gears $b'\ d'$, shaft $e'$, and gears $f'\ c$ to the spindle, the parts being thus adjusted when considerable power is required without high speed.

When it is desired to rotate the spindle more rapidly without so much power, the shaft $h'$ is turned by the handle $g'$ so as to move it away from the spindle, and thus disconnect the gears $d'\ f'$ from gears $b'\ c$. If, now, the gear $c$ be locked to the pulley $b$, the spindle will be rotated at the same speed as the pulley.

My invention relates to the means for detachably connecting the gear $c$ to the pulley $b$, the construction thus far described being old and well known.

In carrying out my invention I provide a bolt, $d$, adapted to fit and slide in a casing or shell, $e$, which casing or shell is screw-threaded, and secured thereby to the outside face of gear $c$, as shown in Fig. 1. Bolt $d$ is so formed as to permit a spiral spring, $h$, to encircle it, one end of said spring bearing against a shoulder, $f$, formed on the inside of the casing $e$, and the other end against the shoulder formed by the enlarged ends of the bolt $d$. Said spring exerts a pressure on said bolt to keep it in the position shown in Fig. 1. The smaller end or shank of bolt $d$ is screw-threaded and engages with an internally-screw-threaded cap, $g$, fitted in the socketed end of the casing $e$ and adapted to turn freely therein, as hereinafter explained.

The bolt *d* is prevented from rotating by a stud, *s*, affixed to the casing *e* and entering a longitudinal groove in the bolt. The face of the cone-pulley *b* is provided with any desired number of holes, 2, each of which is adapted to register with the bolt *d*, the operation of which I will now proceed to explain.

The position of the locking-bolt *d* when it is desired to lock the cone to the gear is that shown in Fig. 1. In said figure the bolt *d* is shown as engaging with one of the holes 2 in the face of the cone, and of course prevents said cone from rotating on the spindle, but compels it to impart accelerated motion to the gear, and through it to the spindle and lathe. Suppose, now, the operator wishes to change the speed of the lathe by imparting motion to the same through the back gear, *f'*, (as is common in all metal-working lathes.) He simply turns the cap *g*, thereby drawing back the bolt *d*, through the medium of the screw-threads on the inside of the same engaging with the screw-threaded portion of said bolt, this operation holding the bolt withdrawn and allowing the cone to rotate freely on the spindle independently of gear *c*. When, now, the operator wishes to lock the cone to the gear, he simply turns cap *g* in the direction opposite to that just described, which movement permits the bolt *d* to be engaged with one of the holes in the cone-face, the pressure of the spring *h* forcing said bolt outwardly from the casing as fast as the cap *g* is rotated.

By my improvement I am enabled to conveniently lock the cone-pulley to and unlock it from the gear, the means employed being much superior to any other means now in use, so far as I am aware.

I claim—

1. In a lathe, the combination of the gear *c*, fixed to the lathe-spindle, the pulley *b*, normally loose on said spindle and provided with one or more orifices or recesses, and a movable locking bolt or catch carried by said gear and adapted to detachably connect the gear and pulley, as set forth.

2. In a lathe, the combination, with the gear *c*, fixed to the spindle *a*, and the pulley *b*, normally loose on said spindle and provided with an orifice or orifices, 2, of a spring-projected bolt carried by the said gear and adapted to engage the orifice 2, and devices whereby said bolt may be retracted and held in an inoperative position against the pressure of its spring, as set forth.

3. The combination, with the gear *c* and apertured pulley *b*, of the casing *e*, secured to the gear, the spring-pressed bolt *d*, adapted to slide in said casing and having a screw-threaded shank, and the screw-threaded cap *g*, adapted to retract the bolt, as set forth.

4. The improved locking attachment for lathes, the same consisting of the casing *e*, externally threaded at one end for engagement with the gear *c*, the bolt *d*, having a screw-threaded shank, the spring *h*, which projects said bolt from the casing, and the internally-threaded cap adapted to retract the bolt, as set forth.

CHARLES H. WESTON.

Witnesses:
C. F. BROWN,
A. D. HARRISON.